US007327955B2

(12) United States Patent
Le Sauze et al.

(10) Patent No.: US 7,327,955 B2
(45) Date of Patent: Feb. 5, 2008

(54) DEVICE AND METHOD FOR SWITCHING OPTICAL DATA FOR OPTICAL COMMUNICATION NETWORKS

(75) Inventors: Nicolas Le Sauze, Bures-sur-Yvette (FR); Dominique Chiaroni, Antony (FR); Denis Penninckx, Nozay (FR)

(73) Assignee: Alcatel, Paris (FR)

( * ) Notice: Subject to any disclaimer, the term of this patent is extended or adjusted under 35 U.S.C. 154(b) by 521 days.

(21) Appl. No.: 10/500,655

(22) PCT Filed: Dec. 24, 2002

(86) PCT No.: PCT/FR02/04548

§ 371 (c)(1),
(2), (4) Date: Jul. 2, 2004

(87) PCT Pub. No.: WO03/061328

PCT Pub. Date: Jul. 24, 2003

(65) Prior Publication Data

US 2005/0117902 A1 Jun. 2, 2005

(30) Foreign Application Priority Data

Jan. 3, 2002 (FR) .................................. 02 00042

(51) Int. Cl.
*H04J 14/00* (2006.01)

(52) U.S. Cl. .......................................... 398/48; 398/51
(58) Field of Classification Search ............. 398/45–57
See application file for complete search history.

(56) References Cited

FOREIGN PATENT DOCUMENTS

EP 1 091 614 A 4/2001

OTHER PUBLICATIONS

K. C. Lee et al, "Routing and switching in a wavelength convertible optical network" Networking: Foundation for the Future, San Francisco, Mar. 28-Apr. 1, 1993, Proceedings of the Annual Joint Conference of the Computer and Communications Societies (INFOCOM), Los Alamitos, IEEE Comp., Soc, US, vol. 2, Conf. 12, Mar. 28, 1993, pp. 578-585, XP01003.*

(Continued)

*Primary Examiner*—Agustin Bello
(74) *Attorney, Agent, or Firm*—Sughrue Mion, PLLC

(57) ABSTRACT

The field of the invention is that of switching optical signals with carrier wavelength conversion capacity, comprising a set of input ports (PE1-PEn), a set of output ports (PS1-PSn) functionally connected to the input ports so that an input signal presented to one of the input ports may be selectively routed to at least one of the output ports, and wavelength conversion means (34) providing a capacity for converting an input signal carrier wavelength to at least one other output port output wavelength.

According to the invention the wavelength conversion capacity of said conversion means (34) is limited by at least one of the following three limitation means i) to iii):

i) for at least one of said output ports (PS), no wavelength conversion may be applied for sending a signal from an input port;

ii) for at least one of said output ports (PS), wavelength conversion may be applied for sending a signal from an input port (PE), but to only a restricted number of wavelength values from the number L of different wavelength values accepted at the input, this restricted number being greater than 0 and less than L, and iii) for only a restricted number of output ports (PS) less than the total number of output ports of the switching system, wavelength conversion may be applied for sending a signal from an input port (PE) to any wavelength value from the number L of different wavelength values accepted at the input.

22 Claims, 8 Drawing Sheets

OTHER PUBLICATIONS

K. C. Lee et al, "Routing and switching in a wavelength convertible optical network" Networking: Foundation for the Future, San Francisco, Mar. 28-Apr. 1, 1993, Proceedings of the Annual Joint Conference of the Computer and Communications Societies (INFOCOM), Los Alamitos, IEEE Comp., Soc, US, vol. 2, Conf. 12, Mar. 28, 1993, pp. 578-585, XP010032262.

K. C. Lee et al, Optimization of a WDM Optical Packet Switch with Wavelength Converters, Proceedings of INFOCOM '95—Conference o n Computer Communications. Fourteenth Annual Joint Conference of the IEEE Computer and Communications Societies, Boston, Apr. 2-6, 1995, Los Alamitos,, IEEE Comp. Soc. Press, vol. 3, Conf. 14, Apr. 2, 1995, pp. 423-430, XP000580606.

* cited by examiner

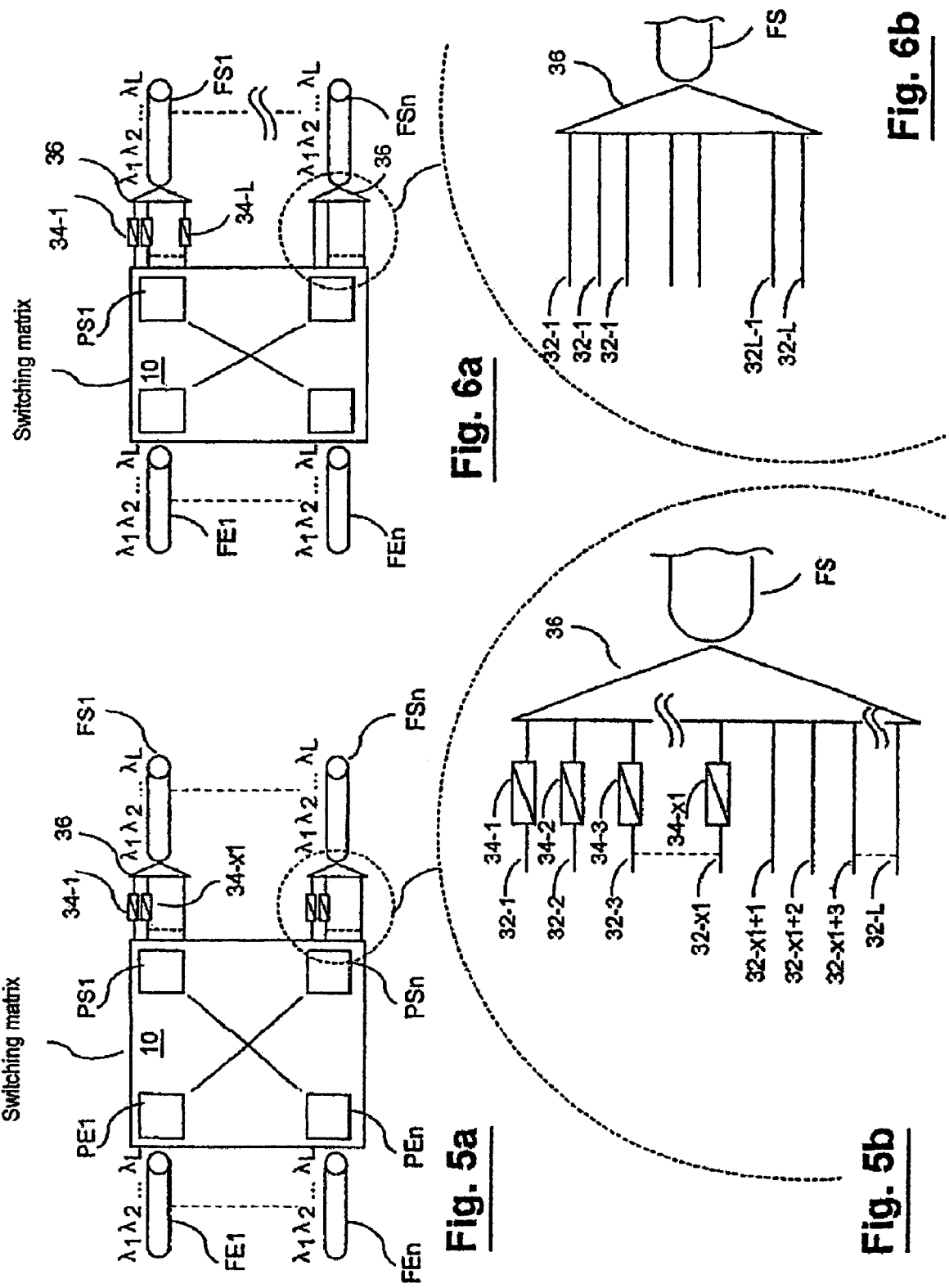

DEVICE AND METHOD FOR SWITCHING OPTICAL DATA FOR OPTICAL COMMUNICATION NETWORKS

The invention relates to the transmission of data in optical communications networks and more particularly to architectures for the switching matrices that are provided at nodes of the network to switching data to different links and peripherals of the network. These matrices must be able to convert the wavelength λ of the switched data carrier as and when required, in particular to multiplex the data and/or to solve contention problems that arise when transporting data on the same fiber. The data may take the form of time division multiplex packets, wavelength division multiplex packets or a circuit mode data stream that is continuous from end to end.

The function of a switching matrix is to gather and forward data by means of a set of input ports and a set of output ports, respectively. Between the input and output ports, the data may be subjected to carrier wavelength conversion or to a predetermined time-delay to ensure its continued safe passage through the network. To this end, switching matrices are equipped with:

multiplexers for converging different separate data channels onto the same fiber, if the matrix manages wavelength division multiplexed data, demultiplexers to carry out the converse process of extracting channels from a set of channels multiplexed onto respective fibers, wavelength converters, which generally have the additional function of amplifying an optical signal, and where applicable, delay lines that act as buffers for separating streams of data in time, in particular to solve contention problems.

With the ongoing growth of data traffic on optical networks, it is becoming necessary to cater for higher and higher bit rates in optical data switching matrices, which imposes complex node architectures that are costly because of the volume of hardware that this implies.

The structure of optical packet switching matrices typically relies on total flexibility of carrier wavelength conversion at all input ports; thanks to wavelength converters associated with the output ports, each input signal may therefore be sent to any output port on any carrier wavelength accepted by the network.

This approach based on total wavelength conversion capacity makes the architectures particularly complex, since it implies multiplying resources in order to ensure that each input wavelength can be forwarded from each output port on all available wavelengths. This leads to high optical losses and to the need for a large number of components, even for architectures that operate in the wavelength domain, i.e. that use wavelength division multiplexing (WDM), precisely with the object of reducing the number of active components.

FIG. 1 is a diagram illustrating the theory of an optical data communications network 2 comprising a set of nodes, of which some nodes 4 operate only within the network and other nodes 4' connected to the nodes 4 are located at the periphery of the network to set up external connections, for example with a gateway. Each node 4 or 4' comprises one or more switching matrices whose ports are connected to links 6 internal to the network 2 and also to network connection lines 8 in the case of the peripheral nodes 4'. The links 6 and connection lines 8 consist of optical fibers which, in the example considered here, use wavelength division multiplexing to convey a plurality of data packets simultaneously on one fiber.

FIG. 2 is a simplified representation of one example of a conventional architecture for a switching matrix 10 of a node 4 or 4' of the network 2. In this example, the matrix is an n×n matrix, i.e. it has a number n of input ports PE1 to PEn (generic designation PE) and the same number n of output ports PS1 to PSn (generic designation PS).

Each input port is connected to a respective input optical fiber cable FE1 to FEn and each output port is connected to an output optical fiber cable FS1 to FSn. Each of the input and output optical fiber cables is able to convey a number L of different carrier wavelengths λ1 to λL, the respective ports being adapted to multiplex and/or demultiplex all L wavelengths.

There is a cross-connection unit 12 between the input ports PE and the output ports PS so that each wavelength of each input port may be connected to all wavelengths of all n output ports, as symbolized by the crossing lines within this unit.

A time-delay unit 14 is provided for imposing a selected time-delay on the lines connecting the input and output ports of the cross-connection unit 12. These time-delays are used in particular to regulate contention when a plurality of data channels wish to access the same output port on the same wavelength at the same time.

FIG. 3 shows in more detail a portion of the FIG. 2 matrix at the level of the input ports PE1 and PEn and the output ports PS1 and PSn and a few of the cross-connections between these ports. Clearly all the input ports PE1 to PEn have substantially the same internal architecture, and likewise all the output ports PS1 to PSn. All the cross-connections between these ports may be deduced by simple extrapolation.

Each input port PE has, connected to its optical fiber input FE, a demultiplexer 16 with L output channels 16-1 to 16-L (generic designation 16) each presenting separately any modulated signal present on the input fiber FE. There is on each of these channels 16-1 to 16-L a respective first wavelength converter 18-1 to 18-L (generic designation 18) for extracting data presented to it at the output of the demultiplexer 16 at a specific wavelength λ1 to λL. The converters are generally based on semiconductor optical amplifiers (SOA) and therefore also have amplification and even regeneration properties.

The output from each first converter 18 is presented to a respective input of a first multiplexer 20 with L inputs for grouping all the outputs of the converters 18-1 to 18-L onto the same output channel 22. The first n multiplexers 20 corresponding to all n input ports PE1 to PEn have the same number of respective output channels 22-1 to 22-n (generic designation 22). Thus for each input port PE1 to PEn, the output of the system described presents the signals present on the input fibers FE1 to Fen, after conversion, on internal carrier wavelengths (λ1 to λL). For each input port, the combination of the demultiplexer 16, the converter 18 and the first multiplexer 20 forms an input conversion and amplification stage.

The output 22 of each first multiplexer 20, which constitutes a single channel, is presented to a respective input of a number K of optical delay lines 24-1 to 24-K (generic designation 24) of the time-delay unit 14. In the diagram, the configuration provides K time-delay lines specific to each output 22 of the first multiplexer, although in practice these lines may be shared if the wavelengths coming from the various input multiplexers are different. Each of the delay lines of a set 24-1 to 24-K imposes a specific time-delay. In the present example, the range of time-delays begins with a null value (zero time-delay), taking the form of a direct connection to the line 24-1. The relationship between the time-delays typically follows a linear progression; for example, the shortest non-zero time-delay imposed (line 24-2) has a value τ and the subsequent lines of the progression respectively impose time-delays of τ, 2τ, 3τ, etc. The value τ is generally equal to the fixed size (temporal duration) of a packet.

The k outputs of the delay lines of each input port constitute buffer outputs enabling time division and in particular concatenation of data arriving simultaneously.

Each output port PS1 to PSn comprises L groups of inputs 26-1 to 26-L (generic designation 26) each having a number n*K of individual inputs connected to receive a respective output of the K delay lines for each of the n input ports PE. Each group of n*K inputs 26-1 to 26-L is received by a first selection unit 27-1 to 27-L for selecting one input port PE from the n input ports with a time-delay k from 1 to K. The data selected by these selection units 27-1 to 27-L is then broadcast by a respective star optical coupler system 28-1 to 28-L (generic designation 28) with L outputs. Each of the L outputs of each set is connected to a second selection unit 29 with L inputs and L outputs. These L outputs are connected to a respective second multiplexer 30-1 to 30-L (generic designation 30).

FIG. 4 shows in more detail a system comprising a first selection unit 27, a star optical coupler system 28, and a second selection unit 29.

The first selection unit 27 comprises a respective SOA specific to each of the n*K inputs, in other words a total of n*K input SOAs (SOA-E), each of which is used as an optical gate for selecting an input line. In service, one selected SOA-E is turned on (switch closed) to launch the passed data, and the n*K−1 other SOA-Es are turned off (switch open) to block the data on their respective channels.

Similarly, the second selection unit 29 comprises a respective SOA specific to each of the L outputs, in other words a total of L output SOAs (SOA-S). Each of these is used as an optical gate PO for selecting a wavelength in association with the input of the multiplexer 30. In service, one selected SOA-S is turned on (switch closed) to launch the passed data, and the other L−1 SOA-Ss are turned off (switch open) to block the data on their respective channels.

The association of an SOA-S i of the selection unit 29 with the input i of the multiplexer 30 (where i is a number from 1 to L) selects the length i from all the data selected by the first selection unit. A multiplexer of this kind is provided for each group of inputs 26-1 to 26-L.

Selection by the FIG. 4 system proceeds in two stages, based on the fact that each input line receives all the data (L wavelengths) coming from an input port (1 to n) and having a time-delay (1 to K), yielding n*K input lines for each output line (one wavelength at one output port):

- a first step in which only one of the n*K inputs is selected by the SOA-E of the first selection unit 27 at a given time, by activating the corresponding SOA-E (switch closed); this unit 27 therefore constitutes a first selection stage; the set of data (L wavelengths) coming from the input port PEj with the time-delay pK is then broadcast by the n*K:L star coupler 28 to the L SOA-Es of the second selection unit 29; and
- a second step for selecting the wavelength λi at the level of the second selection unit 29, which constitutes the second selection stage; the SOA-S corresponding to the wavelength λi is activated (switch closed) so that all of the data (L wavelengths) is sent to port i of the multiplexer; there is therefore obtained at the output only data coming from the wavelength λi of the input port PEj that was subjected in the matrix to the time-delay pK.

The respective output 32-1 to 32-L of each of the L second multiplexers 30 is connected to a respective second wavelength converter 34-1 to 34-L (generic designation 34) before reaching the output fiber FS of the port. These second converters 34 convert the data that is presented to their input from any of the L different wavelengths λ1 to λL to the wavelengths associated with each group. Note that these second converters also serve as regenerators; in addition to their wavelength conversion function, they regenerate optical packets at each switching matrix output in order to restore optical signal quality and to enable the cascading of a plurality of switch matrices.

The output of each of the L second converters 34 is presented to a respective input of a third multiplexer 36 with L input channels and one output channel connected to the output fiber FS of the port. Accordingly, any output port can send on its output fiber FS any data received at the various inputs of the input ports PE1 to PEn at any of the wavelengths λ1 to λL, with any contention resolved by adaptation of the carrier wavelength (this is called spectral resolution) or by imposition of time-delays (this is called temporal resolution).

This provides two solutions to the contention problem, either by processing in the spectral domain (by wavelength conversion) or by processing in the time domain (by imposing time-delays).

Below, the term "internal port" refers to any internal input or output of the switching matrix.

With this kind of architecture, the number of internal ports comprising semiconductor optical amplifiers SOA-Es (first selection unit 27) and SOA-Ss (second selection unit 29) is very large, even in wavelength division multiplex mode operation. This is because it is necessary to provide nK+L internal ports for each output wavelength, which implies in total nL*(nK+L) semiconductor optical amplifiers. That conventional solution therefore implies what is known as complete conversion. More than this, because of considerable optical losses in the optical distributors of the matrix and the cascaded semiconductor optical amplifiers, the optical signals from the matrix are degraded and require the presence of regeneration interfaces, namely the above-mentioned demultiplexer 16, converter 18 and multiplexer 20.

In view of the above, the invention proposes simplified node architectures based on only partial use of wavelength conversion/regeneration in order to render the hardware volume constraints of the optical switching matrices more flexible.

The Applicant has discovered that adequate management of even large data streams can be achieved with correct resolution of potential contention without it being necessary to provide complete wavelength conversion capacity at all of the ports, as required by conventional switching matrix architectures, of which FIG. 3 represents one example.

To be more precise, a first aspect of the invention proposes a system for switching optical signals with carrier wavelength conversion capacity, comprising a set of input ports, a set of output ports functionally connected to the input ports so that an input signal presented to one of the input ports can be selectively routed to at least one of the output ports, and wavelength conversion means providing a capacity for converting an input signal carrier wavelength to at least one other output port output wavelength, characterized in that the wavelength conversion capacity of the conversion means is limited by at least one of the following three limitation means i) to iii):

i) for at least one of the output ports, no wavelength conversion may be applied for sending a signal from an input port;

ii) for at least one of the output ports, wavelength conversion may be applied for sending a signal from an input port, but to only a restricted number of wavelength values from the number L of different wavelength values accepted at the input, this restricted number being greater than 0 and less than L, and iii) for only a restricted number of output ports less than the total number of output ports of the switching system, wavelength conversion may be applied for sending a signal from an input port to any wavelength value from the number L of different wavelength values accepted at the input.

In a fist variant, the wavelength conversion capacity of the conversion means is limited so that wavelength conversion may be applied for sending a signal from an input port via any output port, but only, at each of the output ports, to a restricted number x1 of wavelength values from the number L of different wavelength values accepted at the input, x1 being greater than 0 and less than L.

In a second variant, the wavelength conversion capacity of the conversion means is limited so that wavelength conversion may be applied for sending a signal from an input port to any wavelength value from the number L of different wavelength values accepted at the input but only for switching to a restricted number x2 of output ports, x2 being greater than 0 and less than the number of output ports of the system.

The system may be adapted to switch signals presented in the form of optical data packets.

In the first variant, the limitation of the capacity of the conversion means is applied at the level of at least one of the output ports, each output port at which the limitation is applied comprising a first number of signal line inputs from input ports and a second number L of output lines, this second number representing the number of different wavelengths at the output ports, and at least one of the output lines of this second number of lines has no wavelength conversion means, serving only to send at the output a signal with the same wavelength as that at which the signal is received at the input.

Each output port at which a wavelength conversion limitation is applied may comprise a simplified selection unit for grouping onto each output line, without conversion, signals coming from input lines having the same wavelength as the output line, the unit further comprising, for each output line without conversion, spatial selector means for selecting input lines, the selector means having no spectral selection means and being coupled at their output by coupling means to the output line corresponding to the wavelength of the spatial selector unit.

It may further comprise temporal selection means for delaying a signal from an input port before it is sent at the output of an output port, the temporal selection means presenting to the output ports a number K of copies of signals received at the input ports, each copy being time-shifted relative to the others.

Each output port at which a limitation of wavelength conversion is applied may comprise a set of input lines leading to output lines provided with no conversion means, the set comprising, for a number n of input ports, a number n*K of lines, one for each of the K time-shifted copies coming from each of the n input ports.

The n*K lines of the set may be presented to the input of the simplified selection unit, which produces at its output a number (L-x1) of output lines equal to the total number L of different wavelength values accepted at the input of the system less the restricted number x1 of wavelength values for which carrier wavelength conversion is provided.

Each output port may then comprise a number x1 of sets of input lines each leading to a respective one of x1 output lines with wavelength conversion and each comprising n*K input lines, the output port comprising n*K(x1+1) input lines, each of the x1 sets of lines further comprising, for each of the wavelength values of the restricted number x1 of wavelength values for which carrier wavelength conversion is provided:

a spatial and temporal selection stage receiving at its input a number n*K of input lines, one for each of the K time-shifted copies coming from each of the n input ports, and, using a nK:L coupler, producing a number L of outputs equal to the total number L of wavelength values accepted at the input of the system, a wavelength selection system comprising a spatial selection stage associated with a multiplexer receiving the L outputs at its input and selectively producing one of them at its output, and wavelength conversion means receiving at their input the output of the multiplexer and connected at their output to an output line.

The system may further comprise a multiplexer with L inputs each receiving a respective one of the (L-x1) output lines of the simplified selection units and the x1 outputs of the set of multiplexers and an output sending on an output fiber of the corresponding output port.

It may have a number n of input ports and a number n' of output ports, the numbers n and n' being equal or different, each input port comprising a spectral multiplex comprising a number L of carriers having L respective wavelengths, the system further comprising:

a first buffer stage for imposing a number K of mutually time-shifted copies of each of the n optical input signals, a second stage for converting each of the n*K multiplexes from the first stage into a number of copies equal to n'*(x1+1), and a third selection stage for selecting L optical signals from the nK(x1+1) multiplexes received by an output port PS.

The n*K lines of the set may be presented to the input of the simplified selection unit, which produces at its output a number of output lines equal to the total number L of wavelength values accepted at the input of the system.

It may further comprise a multiplexer with L inputs each receiving a respective one of the output lines of the simplified selection units and an output to an output fiber of the corresponding output port.

The second variant of the system may have a number n of input ports and a number n' of output ports, the numbers n and n' being equal or different, each input port comprising a spectral multiplex comprising a number L of carriers having L respective wavelengths, and the system further comprising:

a first buffer stage for imposing a number K of mutually time-shifted copies of each of the n optical input signals, a second stage for converting each of the n*K signals from the first stage into a number of copies equal to L*x2+n'-x2, and a third selection stage for selecting L optical signals from the n*KL multiplexes received by an output port PS with total wavelength conversion and for selecting L optical signals from the n*K multiplexes received by an output port without wavelength conversion.

A second aspect of the invention provides an optical communications network comprising at least one node for connecting input and output lines, characterized in that the node comprises at least one switching system according to the first aspect of the invention connected to a set of input lines at its input ports and to a set of output lines at its output ports.

The switching system may then be further connected to at least one gateway.

The network may manage contention by temporal distribution of packets, in particular if the packets in contention may not be subjected to wavelength conversion because of the limitation of wavelength conversion capacity, and by spectral and temporal distribution of packets, in particular if the packets in contention may be subjected to wavelength conversion.

A third aspect of the invention concerns the use of a switching system according to the first aspect of the invention for switching data streams in a communications network node with management of contention by temporal distribution of the data streams, in particular if the data streams in contention may not be subjected to wavelength conversion because of the limitation of wavelength conversion capacity, and by spectral and temporal distribution of the data streams, in particular if the streams in contention may be subjected to wavelength conversion.

A fourth aspect of the invention concerns a method of switching optical signals with a carrier wavelength conversion capacity, comprising a set of input ports, a set of output ports functionally connected to the input ports so that an input signal presented to one of the input ports may be selectively routed to at least one of the output ports, wavelength conversion means for providing a capacity for converting an input signal carrier wavelength to at least one other output wavelength at the output of an output port, characterized in that the wavelength conversion capacity is limited by using at least one of the following three limitation possibilities i) to iii):

i) for at least one of the output ports, no wavelength conversion may be applied for sending a signal from an input port;

ii) for at least one of the output ports, wavelength conversion may be applied for sending a signal from an input port, but to only a restricted number of wavelength values from the number L of different wavelength values accepted at the input, this restricted number being greater than 0 and less than L, and iii) for only a restricted number of output ports less than the total number of output ports of the switching system, wavelength conversion may be applied for sending a signal from an input port to any wavelength value from the number L of different wavelength values accepted at the input.

The optional aspects and variants described in the context of the system or the network conforming to the above-mentioned first and third aspects of the invention apply mutatis mutandis to this method.

The invention and the advantages stemming from it will become more clearly apparent on reading the following description of preferred embodiments, which are provided by way of non-limiting example only, which description is given with reference to the appended drawings, in which:

FIG. 1, already described, is a simplified diagram of an optical communications network in which the invention may be used;

FIG. 2, already described, is a simplified general block diagram of an optical switching matrix, showing in particular the relations between the input and output port units;

FIG. 3, already described, is a more detailed block diagram of an optical switching matrix, showing internal elements of the architecture of the input and output port units and buffers employing delay lines;

FIG. 4, already described, is a detailed diagram showing SOA in two successive selection stages at the output of the FIG. 3 optical matrix;

FIG. 5a is a simplified diagram of the architecture of an optical switching matrix conforming to a first variant of the invention;

FIG. 5b shows part of FIG. 5a to a larger scale, showing the outputs of an output port of the matrix in more detail;

FIG. 6a is a simplified diagram of the architecture of an optical switching matrix conforming to a second variant of the invention;

FIG. 6b shows part of FIG. 6a to a larger scale, showing the outputs of an output port of the matrix in more detail;

The embodiments of the invention described relate to switching optical data in the form of packets, although other data structures may be envisaged.

As explained above, the invention stems from the applicant's observation that, depending on the network architecture concerned, conversion/regeneration of all wavelengths and/or on each input or output optical path is not always necessary in optical switching matrices, for example those which manage optical packets. Thus, according to the invention, to simplify the architecture of the nodes, the use of these converters/regenerators is limited, for example by equipping only certain ports or only part of each port. In this way, since complete wavelength conversion (i.e. conversion of all available carrier wavelengths at all output port outputs) is not provided at the output of the optical switching matrices for the ports not provided with a converter/regenerator, the only input wavelengths in contention for a given output wavelength $\lambda i$ are the wavelengths with the same value $\lambda i$ in each input fiber.

Figure 3:
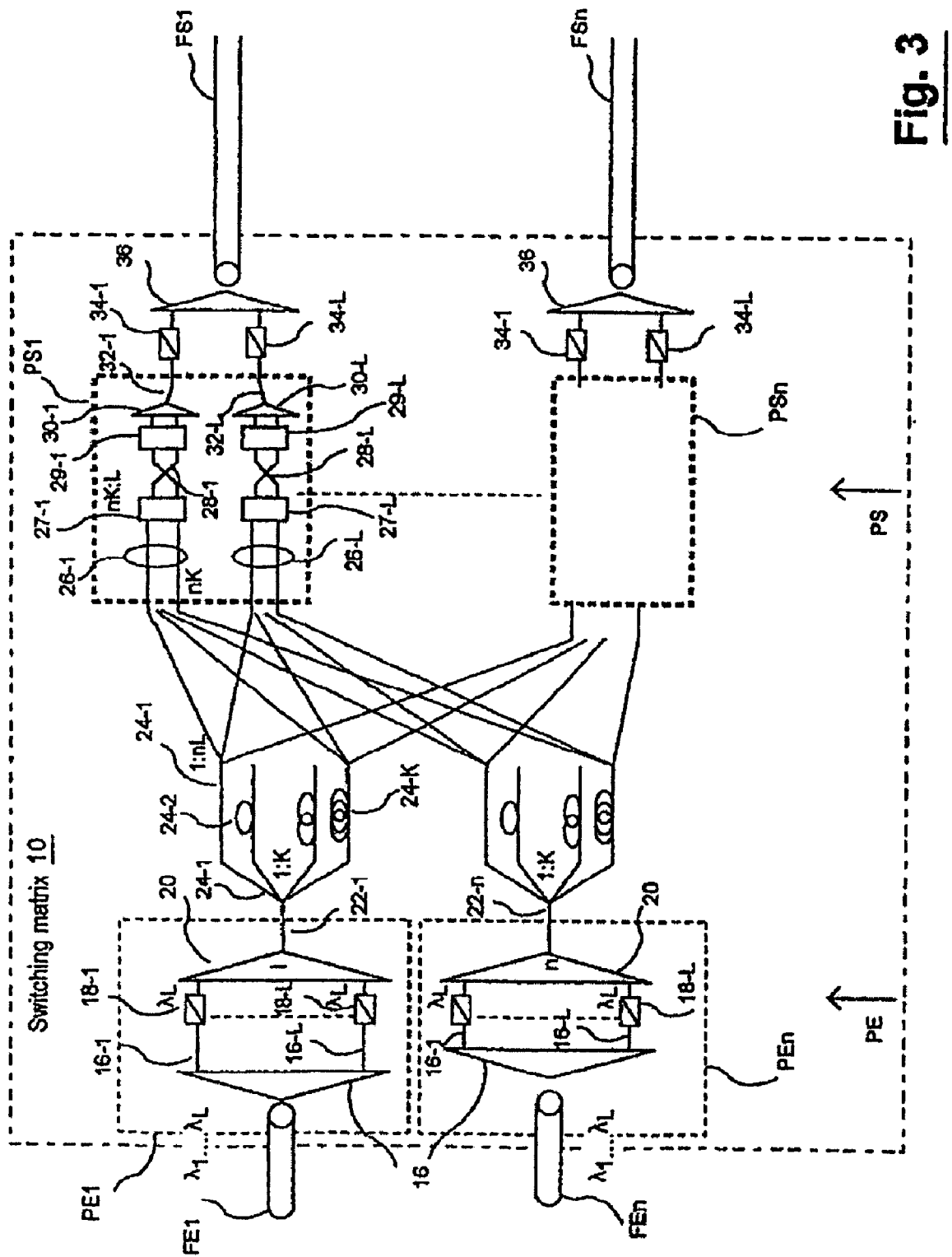
Figure 4:
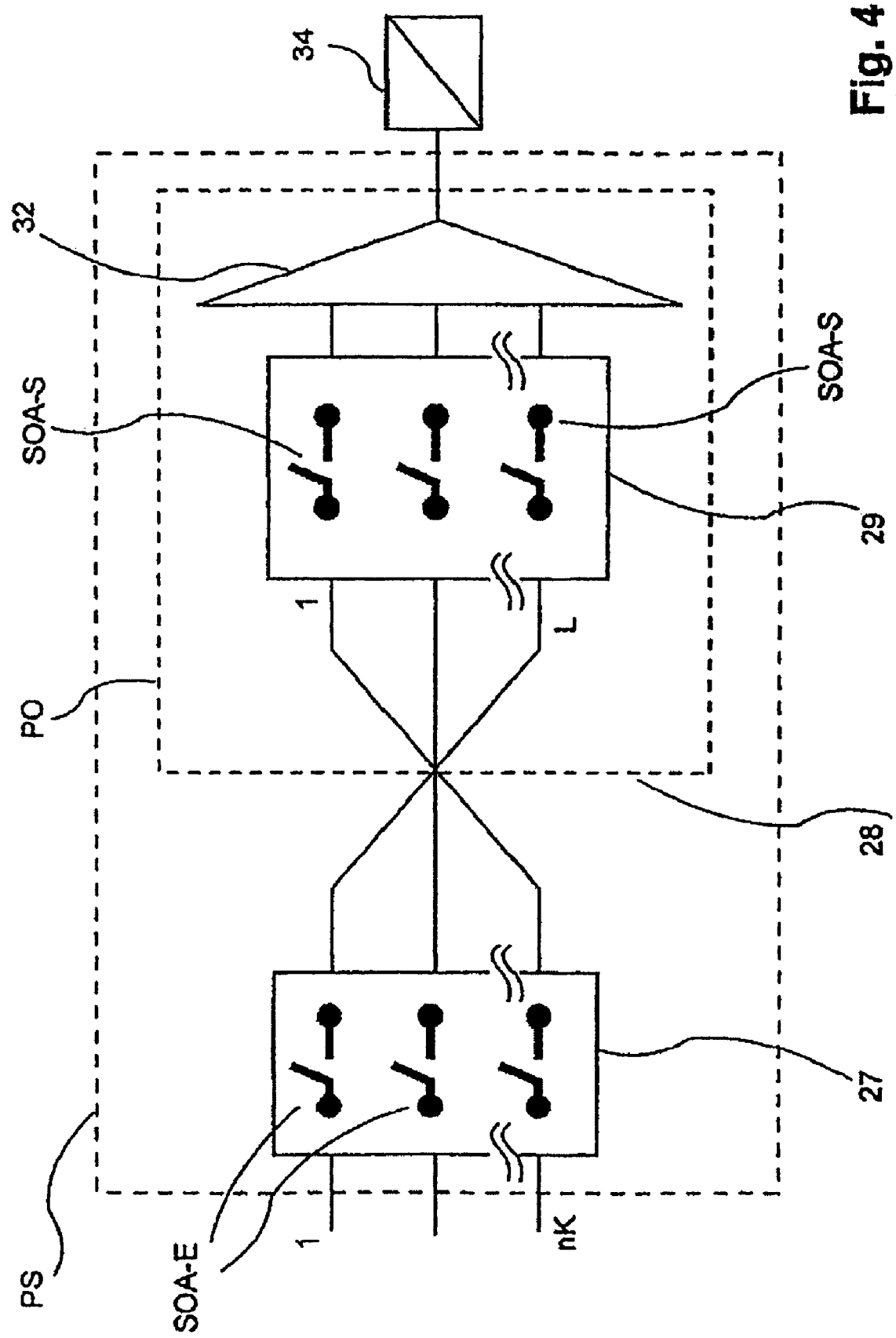

Thus, at a given output port, the second level of wavelength selection performed by the optical cross-connection system 29 with converters 34 in the architecture of FIGS. 3 and 4 may be dispensed with, or at least greatly simplified. This is because systematic wavelength selection is then no longer necessary and the size of the broadcasting optical couplers (1:nL couplers) may be reduced.

Hereinafter, L is the number of available carrier wavelengths for signals processed by the switching matrix and n is the number of input or output ports of the switching matrix.

Two variants of the invention are envisaged:

variant 1: all ports have only a certain number of wavelengths for which conversion is provided, which constitutes the solution referred to hereinafter by the expression "x1/L wavelength λ conversion possibilities at all ports", where x1 is an integer greater than 0 and less than L, and variant 2: certain output ports have no conversion capacity and others have provision for complete conversion, which constitutes the solution referred to hereinafter by the expression "x2/n ports with complete wavelength λ conversion", where x2 is an integer greater than 0 and less than n.

In the present context, the expression "complete conversion" means the facility to convert any input wavelength of a set of wavelengths λ1 to λL to any other wavelength of the set. On the other hand, a conversion possibility reduced to a fraction x1/L or x2/n of these possibilities respectively means that only the number x1 of the L wavelengths may be converted, for a given port, or that only the number x2 of the n output ports are provided with means for complete conversion to any of the wavelengths λ1 to λL.

FIGS. 5a and 5b represent the generic structure of variant 1. These figures represent in simplified form an n×n switching matrix 10 as shown in FIGS. 3 and 4 with its connections to input fibers FE and output fibers FS. The n input ports PE1 to PEn may have a structure that is analogous to that of FIG. 3 and for conciseness is not described again. However, according to one advantageous aspect of the invention, the conversion/regeneration stage of the input ports may be dispensed with, consisting of the following combination: first demultiplexer 16, first wavelength converter 18, first multiplexer 20. This is because the simplified architecture of the invention limits losses and may render this stage unnecessary. The following descriptions of the figures are based on this option with no conversion/regeneration at the input ports. In this case, each of the input fibers FE1 to Fen drives an optical coupler (not shown) that feeds the respective K inputs of the delay lines 24-1 to 24-K; the fibers FE1 to FEn are then connected directly to the points 22-1 to 22-n in FIG. 3.

Differing in this respect from the architecture of FIGS. 3 and 4, the set of n output ports PS is simplified by providing only a number x1 of the L port outputs 32-1 to 32-L adapted to be connected to a respective conversion/regeneration stage 34-1 to 34-x1, as shown more precisely in the view of the outputs to a larger scale shown in FIG. 5b. For each of these x1 outputs, the upstream optical paths, namely the multiplexer 30, the optical coupler 28 and the input group 26, are in practice analogous to those of FIG. 3.

The output (broadcast) stage is simplified at the level of the L-x1 other outputs 32-x1+1 to 32L. These drive the lead multiplexer 36 of the output fiber FS directly, with no interposed conversion/regeneration stage 34. Within the output port, this simplifies optical coupling in particular, subject to the addition of demultiplexers, as explained below. If this architecture is compared to a conventional broadcast and select structure, for example as shown in FIG. 3, it is found that at the broadcast—cross-connection 12—level the size of the optical couplers downstream of the delay lines may be reduced from n*L to n*(x1+1), where x1 is the number of wavelengths with the conversion facility from the n wavelengths. This is because it is sufficient in this instance to broadcast the data to the n output ports PS-1 to PS-n (the factor n is common to the two formulas) and then per output port: one broadcast to each of the x1 groups with conversion plus one broadcast to all the L-x1 groups without conversion. The total number of broadcasts is thus limited to n*(x1+1). This is mainly because, for each of the groups without conversion (for each of the output port wavelengths without conversion), contention is resolved only between data coming from each of the input ports on the same wavelength, whereas for groups with conversion it is necessary to resolve contention between data arriving on all the wavelengths (λ1 to λL) of all the input ports. In both cases, temporal flexibility for resolving contention is retained (access to the K time-delays for all the wavelengths).

Consider by way of example a 2×2 switch with four wavelengths per port. At the output ports, wavelengths λ1 and λ2 are with conversion and wavelengths λ3 and λ4 are without conversion. For the groups 1 and 2, it is possible to receive packets at λ1, λ2, λ3 and λ4 at one of the two input ports, whereas for the ports 3 and 4 it is possible to receive only the packets at λ3 and λ4 at one of the two input ports, respectively. The number of broadcasts after the time-delays is therefore 6 instead of 8 in the case of complete conversion.

FIGS. 6a and 6b, which are diagrams analogous to those of FIGS. 5a and 5b, represent the generic structure of variant 2.

In this situation the reduction of the conversion capacities by the factor x2/n is obtained by providing only a number x2 of the n output ports PS1 to PSn with full conversion and regeneration capacities. Each of these x2 ports is therefore in all respects identical to an output port PS from FIG. 3, the n output ports 32-1 to 32n driving the multiplexer 36 of the output fiber FS via L respective conversion/regeneration stages 34-1 to 34-L.

In this situation, the simplification results from providing no output conversion and regeneration stage for the n−x2 other output ports PSx2+1 to PSn. As shown more precisely by the view of the outputs to a larger scale in FIG. 6b, the L outputs 34-1 to 34-L of each of these n−x2 other ports drive the lead multiplexer 36 of its output fiber FS directly. In these n−x2 ports, this simplifies the optical couplings in particular and eliminates the second multiplexers 28, subject to the addition of demultiplexers/distributors, as explained below, as for variant 1.

Thus in both variants 1 and 2, the complexity of the optical switching matrix is greatly reduced, compared to the prior art, as there is only partial broadcasting within the switching matrix.

Figure 7:
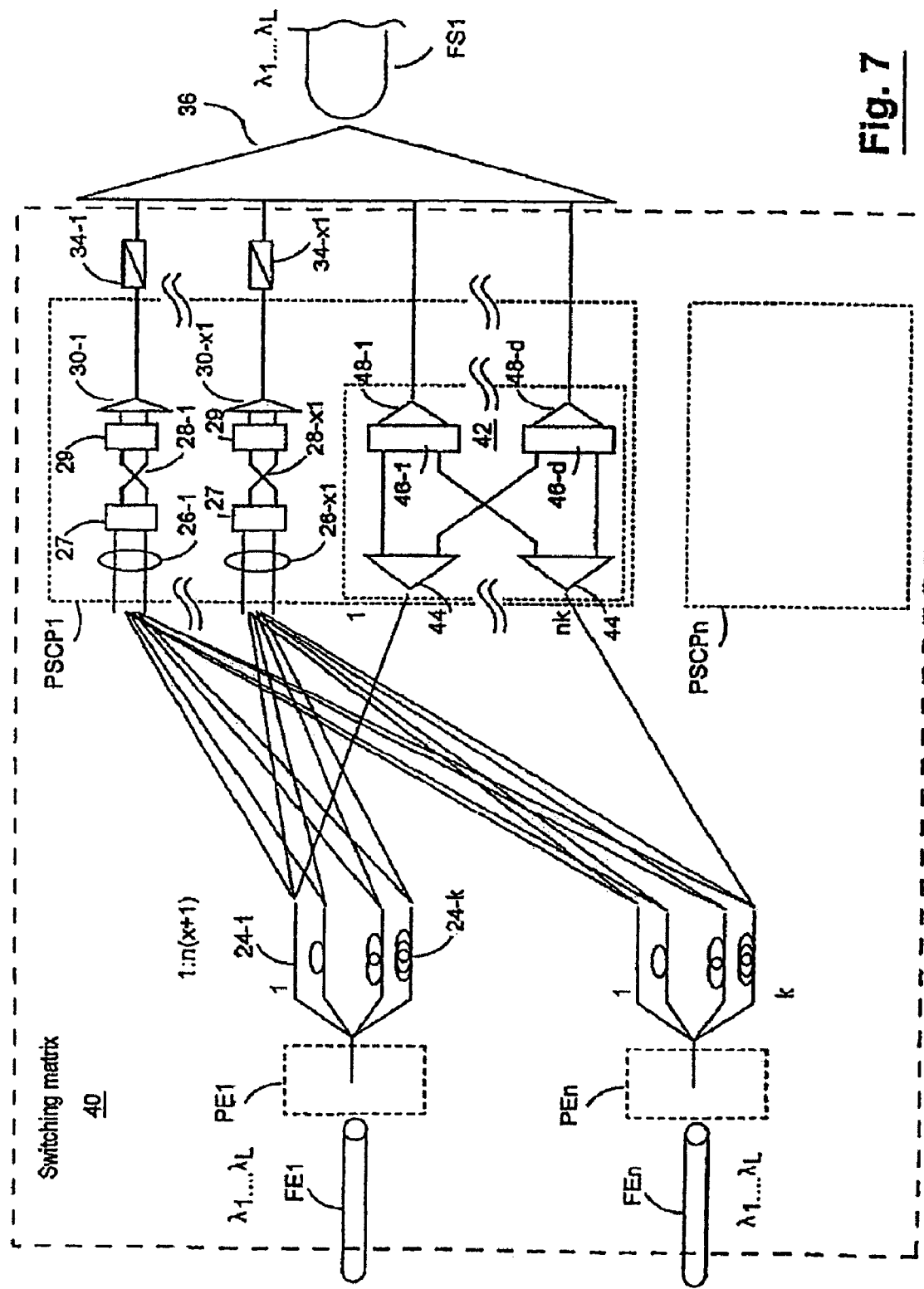
FIG. 7 is a more detailed diagram of an output port architecture and certain internal connections conforming to the first variant of the invention.

FIG. 7 shows in more detail the internal architecture of a switching matrix 40 conforming to the above-mentioned variant 1, the general structure of which has been described with reference to FIGS. 5a and 5b. All of the n partial conversion output ports PSCP are identical, and only the port PSCP1 that drives the output fiber FS1 is represented in detail. Likewise, all the n input ports are identical, and only the outputs 1 to k of the delay lines coming from the two input ports PE1 and PEs are shown (cf. FIG. 3).

Total wavelength conversion with regeneration is provided by the first x1 input groups 26-1 to 26-x1, of which only the first and the x1[th] are shown. The optical processing means and paths for each of these groups 26-1 to 26-x1 are the same as for any other input group 26 from FIG. 3. Thus for each there are, in succession, a coupling system nK:L 28, a second multiplexer 30, and a conversion/regeneration stage 34. The output of each of these x1 stages 34-1 to 34-x1 drives the lead output multiplexer 36 of the output fiber FS.

The L-x1 other inputs of this output multiplexer 36 come directly from an optical selection structure 42 that gathers each of n*K delay line outputs at a respective demultiplexer 44. To be more precise, the optical selection structure 42 receives at its n*K multiplexers 44 the K outputs of the delay lines 24-1 to 24-4 for each of the n input ports PE1 to PEn.

The L-x1 outputs of these n*K demultiplexers 44, corresponding to the L-x1 wavelengths at the output ports without conversion, are gathered by a set of selection strips made up of a number d of selection strips 46-1 to 46-d, where d is equal to L-x1. Each strip receives the data carried by the same wavelength but coming from n*K demultiplexers 44. Thus each of the d strips outputs to a respective nK:1 coupler 48-1 to 48-d (generic designation 48) any of the inputs presented to an input port fiber FE1 to FEn with any of the available K time-delays of the delay lines 24-1 to 24-K, but only at the original wavelength present at the input fiber. Each output of the couplers 48 is presented to the respective input of the output multiplexer 36 corresponding to the wavelength at the output of each selection unit 46. Note that the selection unit therefore has L inputs, of which a number x1 are with wavelength conversion and the remaining L-x1=d are without wavelength conversion.

Figure 8:
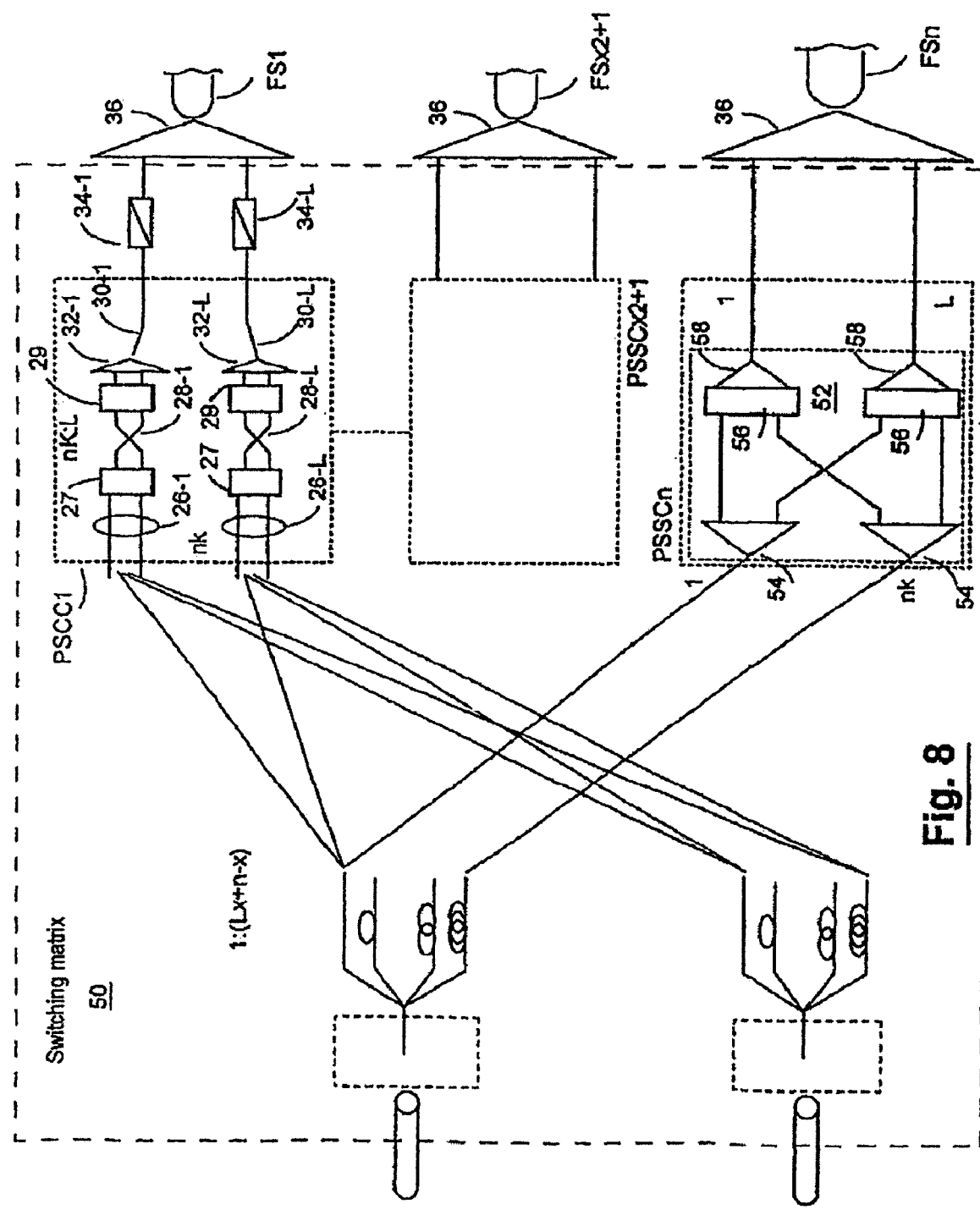
FIG. 8 is a more detailed diagram of an output port architecture and certain internal connections conforming to the second variant of the invention.

FIG. 8 shows in more detail the internal architecture of a switching matrix 50 conforming to the above-mentioned variant 2, the general structure of which is described with reference to FIGS. 6a and 6b. The output ports are of two types: with complete conversion (generic designation PSCC) and without conversion (generic designation PSSC). There are x2 output ports with complete conversion PSCC1 to PSCCx2. Their operation and their connections to the n input ports PE1 to PEn via the delay lines 24-1 to 24-n conform to the description given with reference to FIG. 3 and for conciseness are not described again. The output fibers FS1 to FSx2 of these PSCC ports therefore enable each of them to forward all data presented to the input ports PE1 to PEn on any of the L wavelengths, with the facility of selecting from the K time-delays.

On the other hand, the n-x2 other output ports PSSCx2+1 to PSSCn without conversion provide no conversion of the wavelengths of data presented to their inputs. Their function is limited to selecting on their respective output fiber FS all data presented to the input ports PE1 to PEn, with the facility of selecting from the K time-delays to resolve contention wavelength by wavelength.

To this end, each output port PSSC without conversion comprises a selection system 52 with n*K inputs, one for each of the respective n input ports PE1 to Pen and each of the K available time-delays. The selection system 52 comprises a number n*K of demultiplexers 54, one for each input, and a number L of selection switches 56, each associated with a coupler 58, in the manner of the FIG. 7 selection system 42. The output from each of the n*K demultiplexers 54 is sent to each of the L selection strips 56, each of these strips processing only one wavelength. The L couplers 58 drive directly L respective inputs of the output multiplexer 36, associating the output wavelengths of the selection unit 56 one by one with the input wavelengths of the multiplexer 36, with the result that said multiplexer is able to output one of the n*K inputs on its associated output fiber.

The architectures of the above-mentioned variants 1 and 2 are functionally equivalent, and considerably simplify the prior art architectures (cf. FIG. 3) by reducing the number of input wavelength converters; the input fibers are advantageously connected directly to the optical buffer memory consisting of the delay lines 24-1 to 24-K (with no buffers, k=1), and each comb of wavelengths is therefore broadcast to each delay line. Also, the size of the optical coupler to the output stage is reduced compared to that in FIG. 3. This is because each time-delay is broadcast to each output port PS, but not necessarily at each wavelength of the output ports. There is total broadcasting only at the output wavelengths with conversion, but limited broadcasting to the ports without conversion is sufficient, the remainder being achieved by spectral demultiplexing and one-to-one correspondences between input wavelengths and output wavelengths. Thus the selection process is similar to that of FIG. 3 for ports with wavelength conversion/regeneration (in this instance, two stages of optical gates), but it is simplified for ports without wavelength conversion, necessitating only one stage of optical gates (there is no additional active wavelength selection stage, wavelength selection being achieved passively by means of the demultiplexer 44 in the former case or the demultiplexer 54 in the latter case).

It is clear from FIGS. 7 and 8 that the above-mentioned value x1 or x2 is to be understood as a factor that represents the rate of partial use of conversion/regeneration in the architecture (x1 of the L wavelengths on each output fiber in FIG. 5a, 5b or 7 and x2 of the n output fibers in FIG. 6a, 6b or 8). The broadcasting couplers are therefore reduced to one 1:n(x+1) coupler in FIG. 7 and one (Lx+n−x) coupler in FIG. 8.

If x=0, the optical switching matrix offers no wavelength conversion and if x1=L in FIG. 7 or x2=n in FIG. 8 the optical switching matrix has the full conversion capacity.

In the embodiments shown in FIGS. 7 and 8, which employ optical gates in the form of semiconductor optical amplifiers employing wavelength division multiplexing, to limit the number of wavelengths in each amplifier the value of L should preferably be less than 42. Otherwise, the architecture may be modified as explained in French Patent Application FR 0015889, using band demultiplexing at the input (b bands being intended to have L/b wavelengths per amplifier).

Using only partial wavelength conversion in accordance with the invention simplifies the selection stage of the optical data switches. This impacts directly on the volume of hardware necessary for implementing the optical switching matrices and therefore reduces costs. To illustrate the benefits that may be obtained from the invention, Table I summarizes the volume of hardware used in each case.

TABLE I

Volume of hardware required for different optical switching matrix configurations.

| Architecture | Mux | Couplers | Optical gates | λ conversion |
|---|---|---|---|---|
| Standard (cf. FIG. 3) and L < 32 | Mux L λs ([L + 3] *n) | 1: K (n) 1: nL (nK) NK: L (nL) | [nK + L] *nL | 2nL |
| Variant 1: x1/n λ conv. | Without PE: Mux L | 1: K (nb) 1: n [x + 1] (nk) | [nK + x1] *nL i.e. | Nx1 without PE |

TABLE I-continued

Volume of hardware required for different optical switching matrix configurations.

| Architecture | Mux | Couplers | Optical gates | λ conversion |
|---|---|---|---|---|
| poss./all ports (FIGS. 4a, 4b, 6) | λs ([x1 + 1] *n) With PE: Mux L λs ( [x1 + 3] *n) In both cases: Mux L − x1 (nK* [L − x1] *n | nK: L (nx1) nK: 1 (n* [L − x]) | [nK + L] *nx1 (λ with conv.) + nK* [1 − x1) *n (λ without conversion) | n (L + x1) with PE |
| Variant 2: X2/n ports with complete λ conv. (FIGS. 5a, 5b, 7) | Without PE: Mux L λs ([L + 1] *x2 + nK* [n − x2]) With PE: Mux L λs([L + 1] *x2 + nK* [n − x2] + 2n | 1: K (n) 1: [Lx + n − x2] (nK) nK: L (x2L) nK: 1 ([n − x2] *L | [n²K + Lx2] *L i.e. [nK + L] *Lx2 (ports with conversion) + nKL* [n − x2] (ports without conversion) | Lx2 without PE (nL + Lx2) with PE |

Figure 1:
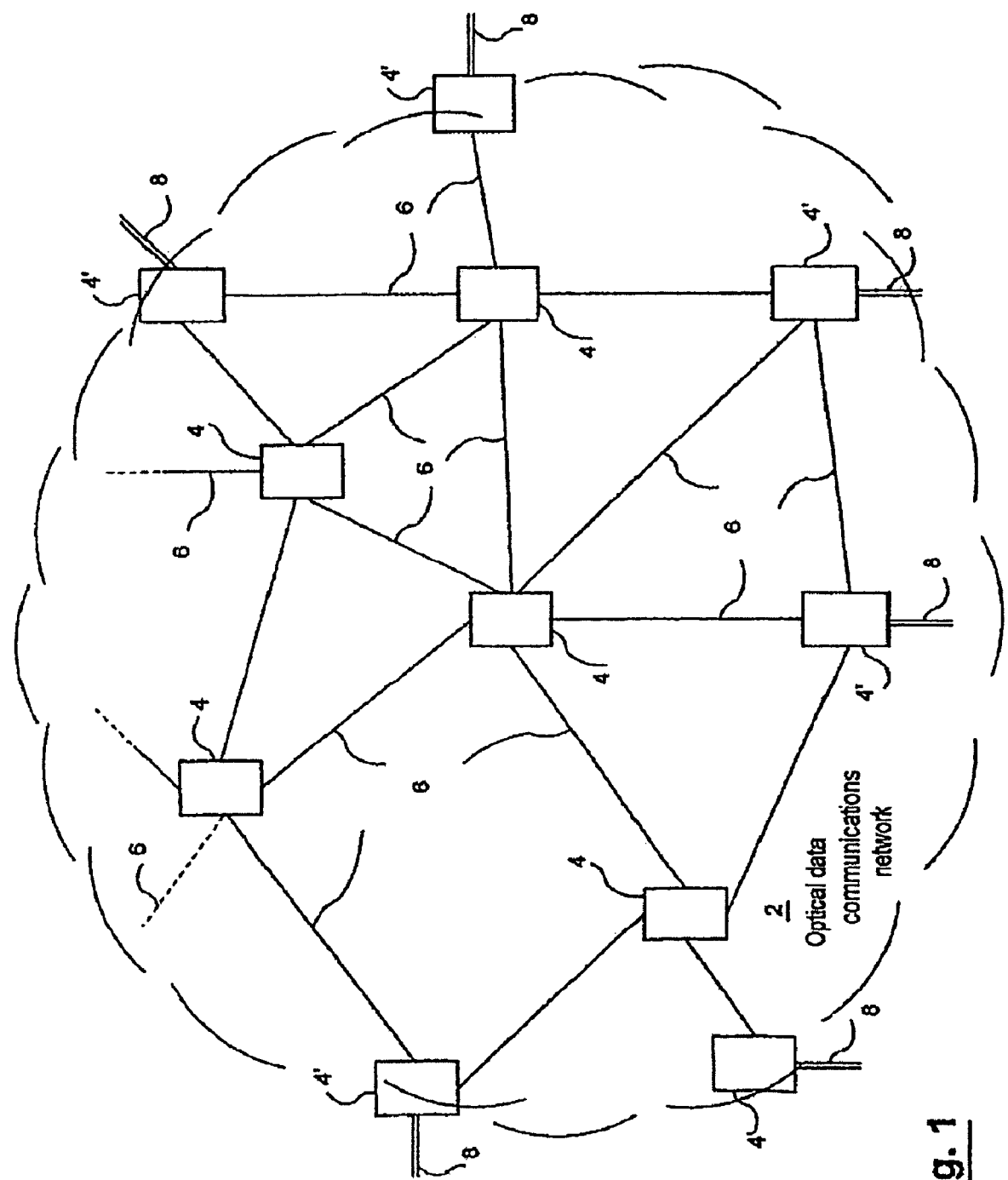
Figure 2:
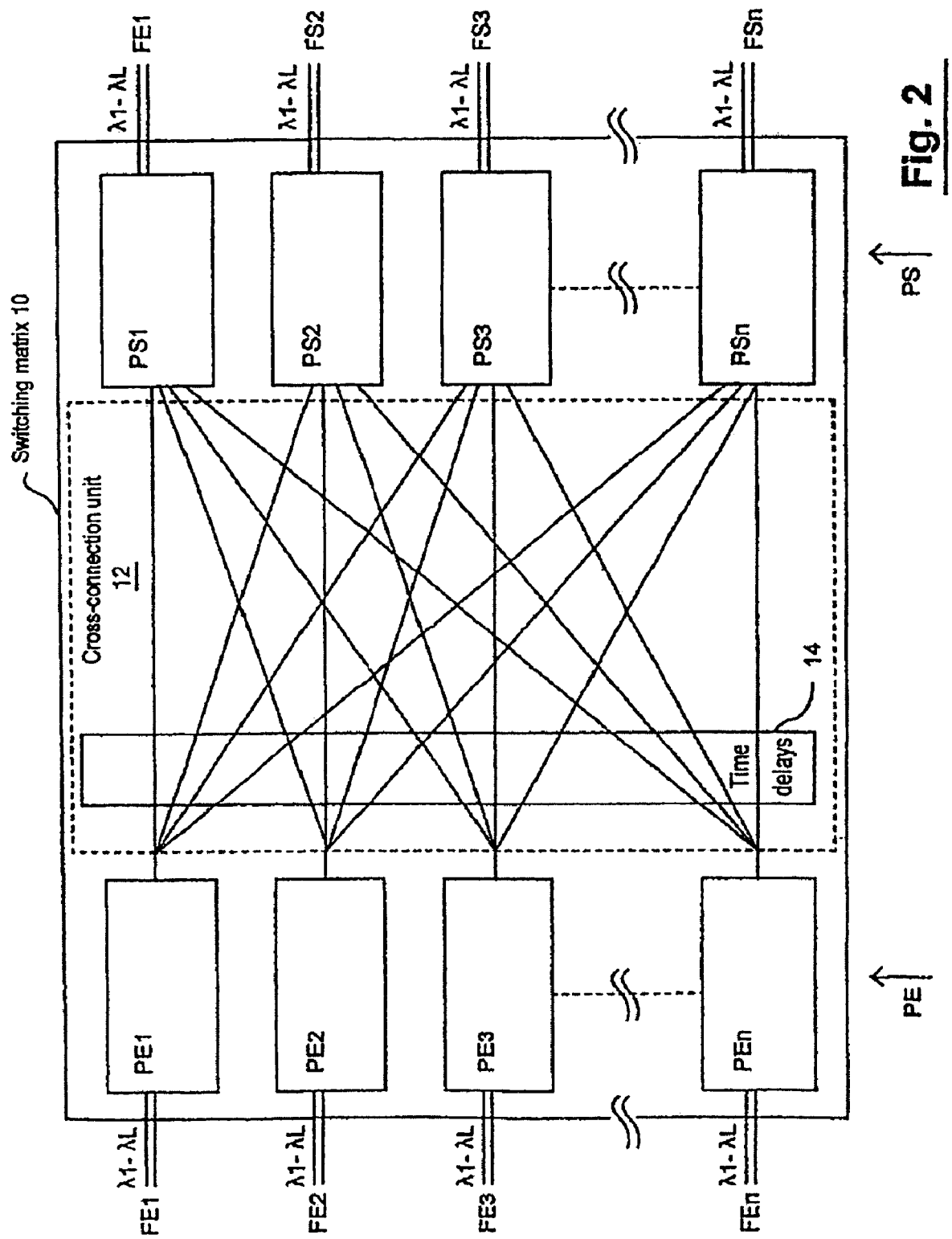

The reduction in terms of semiconductor optical amplifiers compared to a conventional architecture such as that shown in FIG. 1 is (L−x1)*nL for variant 1 (FIGS. 5 and 7) and (n−x2)*L² for variant 2 (FIGS. 6 and 8). For example, a 4×4 architecture may be envisaged with 16 wavelengths per fiber output and an 8-position buffer (n=4, L=16, K=8).

By restricting wavelength conversion to half of the resources (50% of the wavelengths on each fiber in the case of variant 1 (FIGS. 6 and 8) and 50% of the fibers in the case of variant 2 (FIGS. 7 and 9)), 512 semiconductor optical amplifiers are saved in both cases, which is almost 20% of the total number of amplifiers used in a FIG. 3 prior art architecture of similar capacity. For example, the broadcast couplers in FIG. 8 may then be 1:36 couplers, instead of the 1:64 couplers in FIG. 3.

In practice, a 1:64 coupler will have to be used in this example, but in other cases the reduction in coupling could be a good match to existing coupler sizes (taking seven wavelengths with wavelength conversion from the 16 wavelengths of the same example in FIG. 8 would result in a 1:32 coupler).

Clearly it is equally possible to combine the above-mentioned variants 1 and 2, for example to produce a switching matrix in which at least one output port provides conversion of all wavelengths while at least one other port is restricted to converting only a restricted number of different wavelengths processed at the input ports, or a switching matrix with certain ports offering partial conversion and others offering no conversion.

Figure 9:
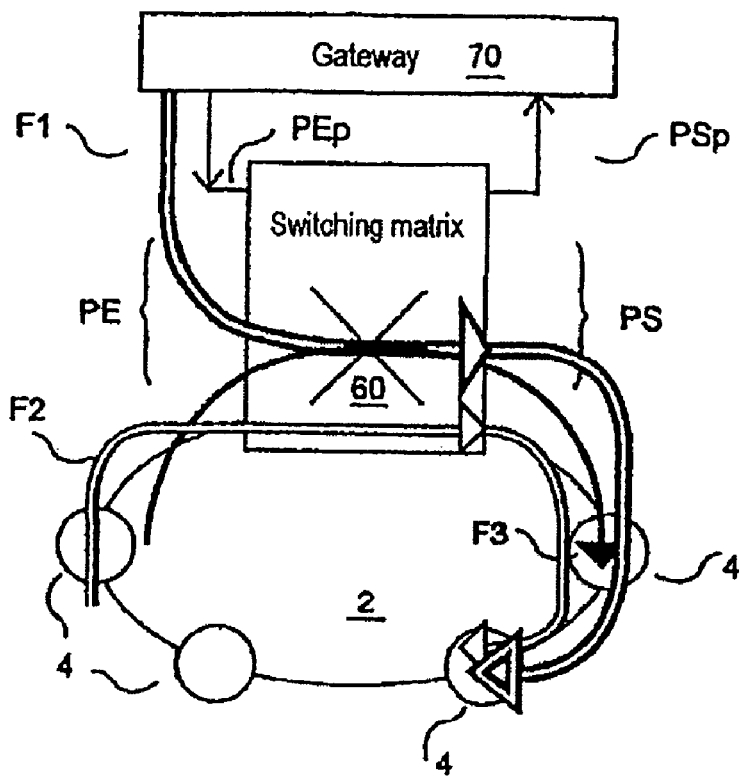
FIG. 9 is a diagram showing the use of an optical switching matrix of the invention in a network with a connection to a gateway, depicting operation with data streams leaving the gateway.
Figure 10:
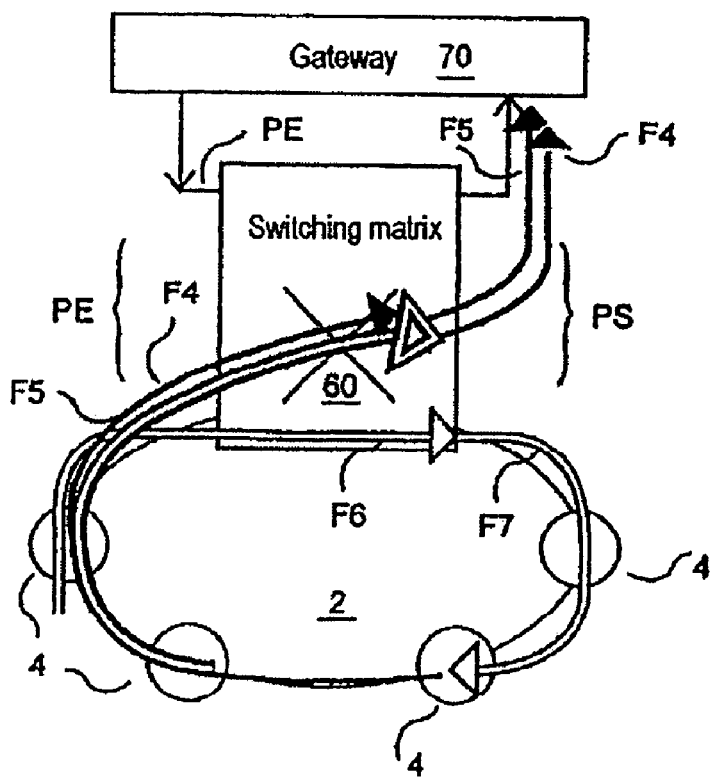
FIG. 10 is a diagram showing the use of an optical switching matrix of the invention in a network with a connection to a gateway, depicting operation with data streams arriving at the gateway.

FIGS. 9 and 10 show examples of the operation of an optical switching matrix for switching optical packets conforming to either of variants 1 and 2 of the invention for routing data packets to a node of an optical network including a local connection gateway.

In the example of FIGS. 9 and 10, a switching matrix 60, which may take the form of the matrix 40 of FIG. 7 or the matrix 50 of FIG. 8, is connected to a gateway 70 and to an optical ring network 2. More particularly, at least one output of the gateway is connected to a respective input port PEp of the matrix 60 and at least one output port PSp of the matrix is connected to a respective input of the gateway. These ports PEp and PSp thus respectively enable the gateway 70 to send and receive optical data packets on the network by means of a conventional connection. The gateway typically provides a connection between the network and a sub-network, for example a metropolitan area network.

The other input and output ports of the switching matrix 60 are connected to the network for routing data in transit in the network and for adding or dropping data on behalf of the gateway.

Communication between the gateway 70 and the network is managed by an MAC protocol. This protocol, which is used in particular when there is no memory along the path, guarantees that the packets from the source reach the destination. In this case, the packets remain on a carrier at the same wavelength throughout their end-to-end path.

However, depending on particular circumstances, it may also be necessary to apply carrier wavelength conversion at the switching matrix 60 between the gateway 70 and the network 2 or to signals in transit in the network via the matrix.

Thus paths via the matrix are provided that may be used without wavelength conversion, in addition to paths with wavelength conversion for dealing with contention. The MAC protocol also handles the choice of whether or not to use wavelength conversion at the matrix 60.

Switching with partial conversion in accordance with the invention then meets all requirements, at the same time as simplifying the architecture.

In the mode of operation shown in FIG. 9, data is sent from the gateway 70 to an input port PEp of the switching matrix 60 (arrows F1). In parallel with this, data traffic in transit crosses the matrix (arrows F2 and F3). Managing streams across the switching matrix then calls for partial wavelength conversion for each fiber, with contention resolved by the MAC protocol. Thus a portion of the traffic is routed without wavelength conversion and only traffic in contention is subjected to wavelength conversion.

In the mode of operation shown in FIG. 10, the switching matrix 60 routes data from the network 2 on respective wavelengths to the gateway 70 (arrows F4 and F5), in parallel with data in transit crossing the matrix (arrows F6 and F7). In this case it is not necessary to apply wavelength conversion to the data F4 and F5 from the network to transfer it to the gateway. Contention is resolved by the MAC protocol for the ring forming the network, and there is no contention between the matrix and the gateway (if there are the same number of wavelengths at the input PE of the matrix connected to the ring as at the output port PSp). If a terminal connected to the gateway is able to access the matrix at a given wavelength, the matrix always remains available for communication between the matrix 60 and the gateway 70, since there is no contention with traffic coming from PEp.

Numerous embodiments and variants that do not depart from the scope of the invention may be envisaged, for example with regard to the hardware, functional, and management means and the dimensions of the hardware.

The invention claimed is:

1. A system for switching optical signals with carrier wavelength conversion capacity, comprising a set of input ports, a set of output ports functionally connected to the input ports so that an input signal presented to one of the input ports are selectively routed to at least one of the output ports, and wavelength conversion means providing a capacity for converting an input signal carrier wavelength to at least one other output port output wavelength, said wavelength conversion capacity of said conversion means being limited by at least one of the following three limitation means i) to iii):

i) for at least one of said output ports, no wavelength conversion is applied for sending a signal from an input port;

ii) for at least one of said output ports, wavelength conversion is applied for sending a signal from an input port, but to only a restricted number of wavelength values from the number L of different wavelength values accepted at the input, this restricted number being greater than 0 and less than L, and iii) for only a restricted number of output ports less than the total number of output ports of the switching system, wavelength conversion is applied for sending a signal from an input port to any wavelength value from the number L of different wavelength values accepted at the input, the system having a number n of input ports and a number n' of output ports, the numbers n and n' being equal or different, each input port comprising a spectral multiplex comprising a number L of carriers having L respective wavelengths;

wherein the system further comprises:

a first buffer stage for imposing a number K of mutually time-shifted copies of each of the n optical input signals, a second stage for converting each of the n*K multiplexes from the first stage into a number of copies less than n', and a third selection stage for selecting L optical signals from the multiplexes provided by the second stage to an output port.

2. The system according to claim 1, wherein said wavelength conversion capacity of said conversion means is limited so that wavelength conversion is applied for sending a signal from an input port via any output port, but only, at each of the output ports, to a restricted number x1 of wavelength values from the number L of different wavelength values accepted at the input, x1 being greater than 0 and less than L.

3. The system according to claim 1, wherein said wavelength conversion capacity of said conversion means is limited so that wavelength conversion is applied for sending a signal from an input port to any wavelength value from the number L of different wavelength values accepted at the input but only for switching to a restricted number x2 of output ports, x2 being greater than 0 and less than the number of output ports of the system.

4. The system according to claim 1, wherein it is adapted to switch signals presenting in the form of optical data packets.

5. The system according to any of claim 1, wherein said limitation of the capacity of the conversion means is applied at the level of at least one of the output ports, each output port at which said limitation is applied comprising a first number of signal line inputs from input ports and a second number L of output lines, this second number representing the number of different wavelengths at the output ports, and at least one of the output lines of this second number of lines has no wavelength conversion means, serving only to send at the output a signal with the same wavelength as that at which the signal is received at the input.

6. The system according to claim 1, wherein each output port at which a wavelength conversion limitation is applied comprises a simplified selection unit for grouping onto each output line, without conversion, signals coming from input lines having the same wavelength as the output line, the unit further comprising, for each output line without conversion, spatial selector means for selecting input lines, said selector means having no spectral selection means and being coupled at their output by coupling means to said output line corresponding to the wavelength of the spatial selector unit.

7. The system according to claim 1, further comprising temporal selection means for delaying a signal from an input port before it is sent at the output of an output port, the temporal selection means presenting to the output ports a number K of copies of signals received at the input ports, each copy being time-shifted relative to the others.

8. The system according to claim 1, wherein each output port at which a limitation of wavelength conversion is applied comprises a set of input lines leading to output lines provided with no conversion means, the set comprising, for a number n of input ports, a number n*K of lines, one for each of said K time-shifted copies coming from each of the n input ports.

9. The system according to claim 1, wherein each output port at which a limitation of wavelength conversion is applied comprises a set of input lines leading to output lines provided with no conversion means, the set comprising, for a number n of input ports, a number n*K of lines, one for each of said K time-shifted copies coming from each of the n input ports, and wherein said n*K lines of the set are presented to the input of said simplified selection unit, said unit producing a number (L-x1) of output lines equal to the total number L of different wavelength values accepted at the input of the system less said restricted number x1 of wavelength values for which carrier wavelength conversion is provided.

10. The system according to claim 9, wherein each output port comprises a number x1 of sets of input lines each leading to a respective one of x1 output lines with wavelength conversion and each comprising n*K input lines, said output port comprising n*K(x1+1) input lines, each of said x1 sets of lines further comprising, for each of the wavelength values of said restricted number x1 of wavelength values for which carrier wavelength conversion is provided:

a spatial and temporal selection stage receiving at its input a number n*K of input lines, one for each of said K time-shifted copies coming from each of the n input ports and, using a nK:L coupler, producing a number L of outputs equal to the total number L of wavelength values accepted at the input of the system, a wavelength selection system comprising a spatial selection stage associated with a multiplexer receiving said L outputs at its input and selectively producing one of them at its output, and wavelength conversion means receiving at their input the output of said multiplexer and connected at their output to an output line.

11. The system according to claim 10, further comprising a multiplexer with L inputs each receiving a respective one of the (L-x1) output lines of said simplified selection units and the x1 outputs of the set of multiplexers and an output sending on an output fiber of the corresponding output port.

12. The system according to claim 1, wherein:
it is adapted to switch signals presenting in the form of optical data packets;
said second stage includes means for converting each of the n*K multiplexes from the first stage into a number of copies equal to n'*(x1+1), and
said third selection stage includes means for selecting L optical signals from the nK(x1+1) multiplexes received by an output port.

13. The system according to claim 1, wherein each output port at which a limitation of wavelength conversion is applied comprises a set of input lines leading to output lines provided with no conversion means, the set comprising, for a number n of input ports, a number n*K of lines, one for each of said K time-shifted copies coming from each of the n input ports, and wherein said n*K lines of the set are presented to the input of said simplified selection unit, said block producing at its output a number (L) of output lines equal to the total number L of wavelength values accepted at the input of the system.

14. The system according to claim 13, further comprising a multiplexer with L inputs each receiving a respective one of the (L) output lines of said simplified selection units and an output to an output fiber of the corresponding output port.

15. The system according to claim 1, wherein:
said second stage includes means for converting each of the n*K signals from the first stage into a number of copies equal to L*x2+n'-x2, and
said third selection stage includes means for selecting L optical signals from the n*KL multiplexes received by an output port PS with total wavelength conversion and for selecting L optical signals from the n*K multiplexes received by an output port without wavelength conversion.

16. An optical communications network comprising at least one node for connecting input and output lines, wherein said node comprises at least one switching system according to claim 1, connected to a set of input lines at its input ports and to a set of output lines at its output ports.

17. The network according to claim 16, wherein the switching system is further connected to at least one gateway.

18. The network according to claim 16, wherein packets within the network which are in contention are not subjected to wavelength conversion.

19. The system according to claim 1, wherein data streams in contention are not subjected to wavelength conversion.

20. A method of switching optical signals with a carrier wavelength conversion capacity, comprising a set of input ports, a set of output ports functionally connected to the input ports so that an input signal presented to one of the input ports is selectively routed to at least one of the output ports, wavelength conversion means for providing a capacity for converting an input signal carrier wavelength to at least one other output wavelength at the output of an output port, wherein the wavelength conversion capacity is limited by using at least one of the following three limitation possibilities i) to iii):

i) for at least one of said output ports, no wavelength conversion is applied for sending a signal from an input port;

ii) for at least one of said output ports, wavelength conversion is applied for sending a signal from an input port, but to only a restricted number of wavelength values from the number L of different wavelength values accepted at the input, this restricted number being greater than 0 and less than L, and iii) for only a restricted number of output ports less than the total number of output ports of the switching system, wavelength conversion is applied for sending a signal from an input port to any wavelength value from the number L of different wavelength values accepted at the input, wherein a number K of mutually time-shifted copies of each of n optical input signals are provided, wherein each of the n*K mutually time-shifted copies are converted into a number of copies less than n', and wherein L optical signals are selected from the converted number of copies less than n' to an output port.

21. The method according to claim 20, wherein said wavelength conversion capacity is limited so that wavelength conversion is applied for sending a signal from an input port via any output port but, for each of the output ports, only to a restricted number x1 of wavelength values from the number L of different wavelength values accepted at the input, x1 being greater than 0 and less than L.

22. The method according to claim 20, wherein said wavelength conversion capacity is limited so that conversion is applied for sending a signal from an input port to only a restricted number x2 of the number n of output ports, x2 being greater than 0 and less than the number of output ports, but with a capacity for wavelength conversion to any wavelength value of the number L of different wavelengths accepted at the input.

* * * * *